United States Patent [19]
Smith

[11] 3,873,654
[45] Mar. 25, 1975

[54] PROCESS OF FORMING A RIGID FOAM AIRFOIL SECTION

[76] Inventor: Robert G. Smith, 8941 Reseda Blvd., North Ridge, Calif. 91324

[22] Filed: Mar. 5, 1973

[21] Appl. No.: 338,143

[52] U.S. Cl. ............... 264/46.4 A, 156/245, 161/161, 244/123, 264/45.5
[51] Int. Cl. ............................................ B29d 27/00
[58] Field of Search ............................... 264/45, 321

[56] References Cited
UNITED STATES PATENTS

| | | | |
|---|---|---|---|
| 2,728,702 | 12/1955 | Simon et al. | 264/45 X |
| 2,767,436 | 10/1956 | Noland et al. | 264/321 X |
| 2,899,708 | 8/1959 | Donaldson et al. | 264/321 X |
| 3,008,859 | 11/1961 | Smack | 156/79 |
| 3,013,922 | 12/1961 | Fisher | 264/45 X |
| 3,161,436 | 12/1964 | Hood | 264/45 X |
| 3,246,443 | 4/1966 | Slemmons | 264/45 X |
| 3,301,927 | 1/1967 | Exley et al. | 264/45 |
| 3,684,633 | 8/1972 | Haase | 264/321 X |

FOREIGN PATENTS OR APPLICATIONS

| | | | |
|---|---|---|---|
| 486,927 | 4/1970 | Switzerland | 264/321 X |

*Primary Examiner*—H. S. Cockeram
*Attorney, Agent, or Firm*—Robert G. Upton

[57] ABSTRACT

A wing, stabilizer, or the like forming process wherein an oversized foam core is compressed between split molds having partially cured epoxy-coated fiberglass cloth laid up in both halves of the molds, thus assuring a good bond between the cloth and the foam core during the final curing process.

6 Claims, 3 Drawing Figures

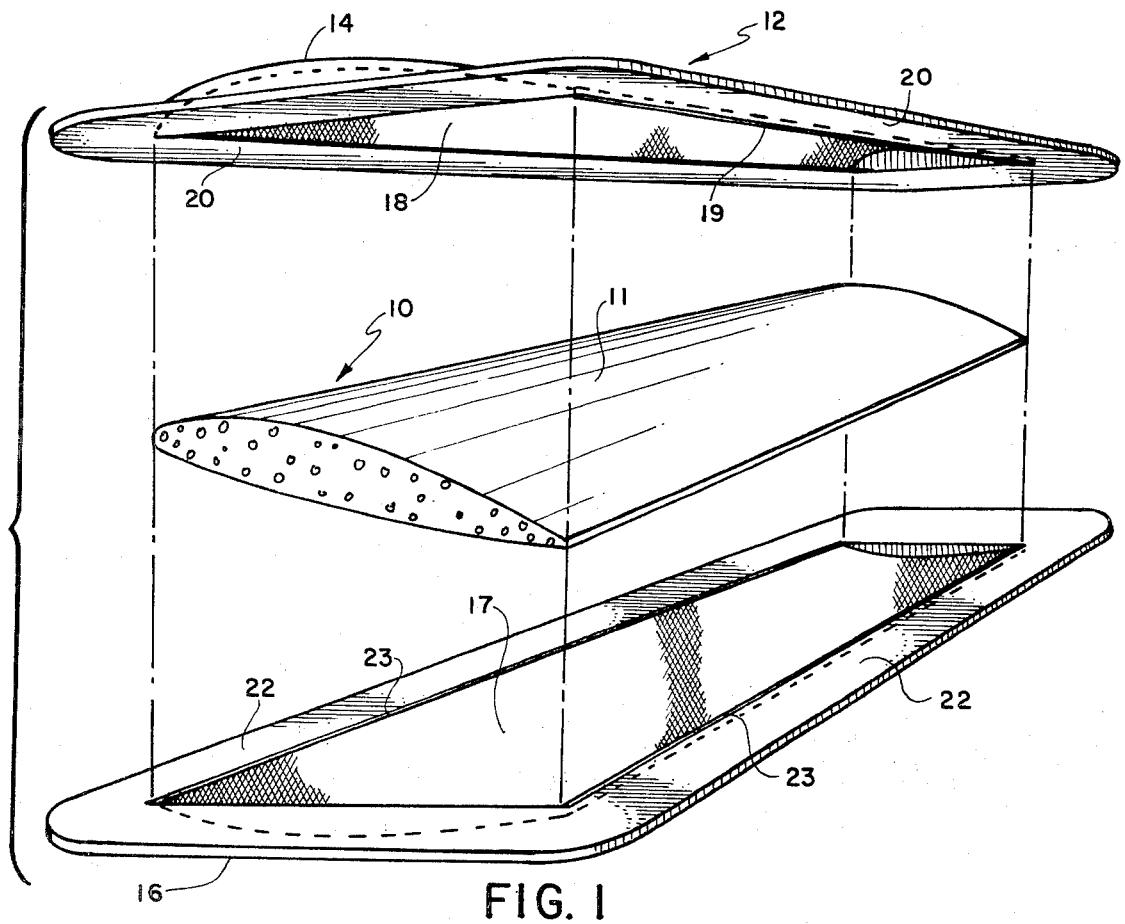
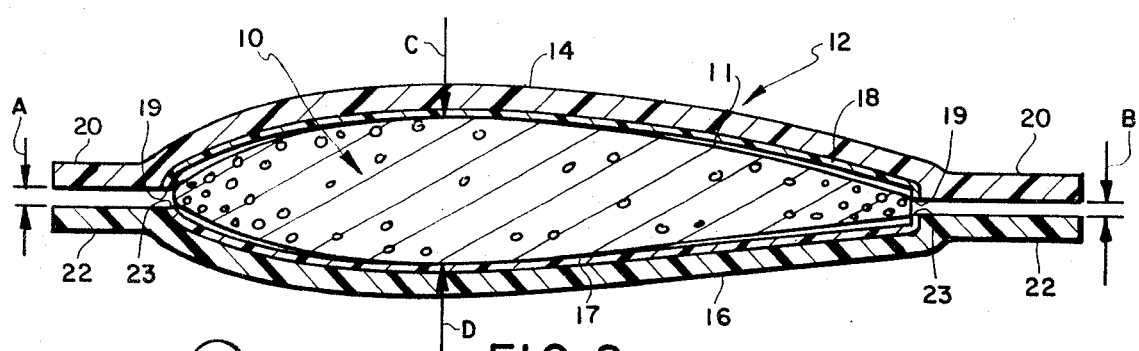
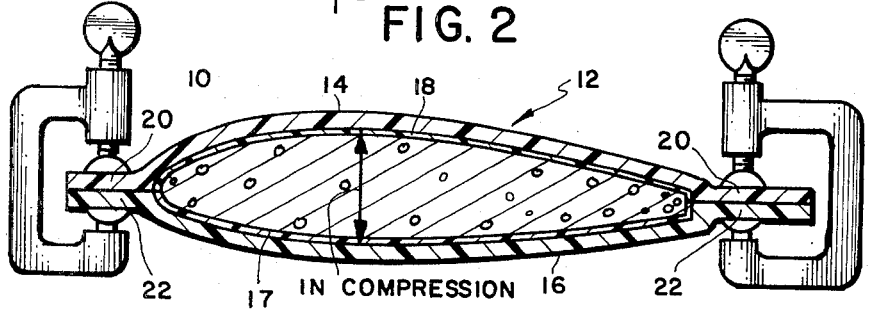
FIG. 1
FIG. 2
IN COMPRESSION
FIG. 3

PROCESS OF FORMING A RIGID FOAM AIRFOIL SECTION

BACKGROUND OF THE INVENTION

1. Field of the Invention

This invention relates to a process for forming wings or stabilizers or the like from rigidized foam material.

2. Description of the Prior Art

The prior art discloses numerous methods for forming reinforced plastic structures and the like. U.S. Pat. No. 2,793,971 discloses a method to form automobile type window moldings and door posts, etc. The patent discloses a styrofoam type core which is surrounded by a plastic shell. A split mold is utilized wherein layers of semi-liquid plastic are formed in the molds. A preformed core is then applied to the voids in the mold between the plastic layers, the molds are then brought together in contact with the preformed core and which is subsequently heated to cure and join the plastic layers together. The resultant monolithic structure is removed from the split molds after the thermosetting plastic covering material is cured. This process is disadvantaged in that the foam cores, being cut to the exact size of the hollow core centers may create voids between the core and the covering material laid up in the split molds. These voids occur when the foam cores are not exactly cut to shape.

U.S. Pat. No. 2,589,786 discloses a method of forming hollow plastic bodies. A split mold is utilized wherein a thermosetting, fibrous resin material is injected between the mold halves, the halves being subsequently subjected to high pressure to form a core of the size and shape of the cavity between the split molds. The core is then removed from the molds and thermosetting plastic material is then laid up on each half of the mold, followed by a sheet of separating material which when the mold is placed over the core material, separates the core from the phenolic, impregnated fiber cloth in each half of the mold. By utilizing the core material, a relatively uniform thickness of the cloth material in each half of the mold is maintained. Upon curing, the center core is removed from the mold, leaving the two half shells. The half shells are subsequently joined together to form the finished hollow product. This invention is disadvantaged in that it does not utilize a foam core material as a strengthening material, thus while the finished product is lighter, it does not have the strength it would have if the core material were left within the layers of phenolic material.

U.S. Pat. No. 3,350,252 discloses a method to manufacture bowling balls. A rigid, pre-shaped inner portion such as pre-shaped foam material is positioned within sections of an uncured, pre-shaped outer portion to provide an integrated pre-shaped assemblage for curing. When a spherical insert composed of a solid cellular material is confined within the spherical interior of the shell and the integrated assemblage is cured under heat and pressure, tenacious bonding occurs at the shell and surface interface. Heat and pressure are applied to the ball during the curing process, thus bonding the layers of material together.

None of the foregoing prior art patents teaches a method to form wings, stabilizers or the like in a pair of split molds wherein the compressible core material is cut oversize to assure intimate contact between the core and the covering material.

Accordingly, it is an object of this invention to provide a method to form wings, stabilizers, and the like, in a mold using light-weight foam cores as a structural element.

More particularly, it is an object of this invention to provide a method to form wings, stabilizers, and the like in a split mold wherein layers of fiberglass cloth are laid up in the mold halves, partially curing the layers of cloth followed by insertion of an oversized, compressible core material between the partially cured layers of glass cloth. The mold halves are compressed together during the curing process, thus assuring that the surface of the core material is in intimate contact with the fiberglass skins in the molds.

SUMMARY OF THE INVENTION

This invention provides a method to form flying surfaces such as wings, stabilizers, rudders, etc., utilizing a molding process. A split mold is utilized wherein layers of fiberglass cloth are laid up in each half of the molds, partially cured, followed by coating of the partially cured fiberglass cloth with an epoxy-type resin. An inner core structure is formed by using a hot wire process whereby templates are placed at both ends of a block of, for example, styrofoam material, which acts as a guide for a hot wire stretched between the templates, the hot wire passing over the templates easily cuts the foam material to the shape of the templates at adjacent ends of the foam block. The foam core is intentionally cut oversize so that when the foam core material is placed between the molds, the edges of the molds will not come together. The oversize foam core material is then placed between the molds having the glass cloth in the molds coated with the epoxy glue material. The molds are then brought together over the oversize foam core, followed by clamping the overlapping edges of the split molds, thus compressing the foam core material between the layers of fiberglass cloth, thereby assuring that the foam core material adheres intimately to the surface of the fiberglass cloth layers. By clamping the edges of the split molds together, the foam core material is compressed between the layers of the glass cloth. By enlarging the core specific areas, such as the high point of an airfoil section, the point at which the high point of the airfoil curvature occurs when viewed in cross-section, the thickest part of the wing in depth is compressed more than the rest of the wing, thus rigidizing the wing at a critical structural point, thereby lessening the possibility of snapping the wing along the entire wing span during high stress maneuvers or the like. The more the rigidized foam material is compressed, the more rigid the material becomes in the area of higher compression as explained above. By utilizing enlarged foam cores, voids between the foam core and fiberglass covering materials are eliminated, thus preventing unsightly dips or grooves in the finished product. Additionally, the wing is much more strengthened, due to the intimate contact of the core material with the covering material.

Thus an advantage over the prior art is the method in which an oversize foam core is utilized, thereby ensuring intimate contact of the foam core with the covering material while the foam core and covering material are allowed to cure within a split mold which holds the composite structure in compression while it is finally cured.

DESCRIPTION OF THE DRAWINGS

The above noted objects and advantages of the present invention will be more fully understood upon studying the following detailed description in conjunction with the detailed drawings in which:

FIG. 1 is an exploded perspective view of a split mold illustrating layers of fiberglass cloth in each half of the mold with an oversize foam core in between the halves of the mold;

FIG. 2 is a cross-sectional view of the split mold with the fiberglass layers laid up in each half of the mold with the oversize foam core displaced between the halves of the mold; and FIG. 3 is a cross-sectional view of the split molds being clamped together along their peripheral edges, thus compressing the foam core material between the layers of the fiberglass material laid up in the halves of the mold.

DESCRIPTION OF THE PREFERRED EMBODIMENTS

Turning now to FIG. 1, the foam core generally designated as 10 may be, for example, a wing panel for a model aircraft. The foam core is routinely cut from foam blocks. Normally, foam blocks are rough cut to a general plan form shape, followed by attaching wing airfoil templates to adjacent ends of the rough cut block of foam material. The templates are normally pinned to the foam block at both ends and the templates are generally fabricated from a heat resistant material such as metal or the like. The templates are subsequently marked off at even increments about the peripheral edge of the airfoil section. The equidistantly spaced increments are then sequentially numbered for the following reason. After the ribs pinned to the end faces of the foam block, the block is then ready to be cut. A length of electrically heated wire is stretched between a bow, the wire and bow being of greater length than the foam block. The wire is then heated to a temperature sufficient to melt the foam material. Two people at opposite ends of the bow position themselves over the foam block to be cut. The wire is then passed into the foam block, controlled by operators at each end of the bow. As the wire moves over the templates, verbal coordination between the operators takes place during the foam slicing cycle, thus maintaining the wire at the same posititon chord-wise at opposite ends of the foam block. The operator at one end indicates verbally that he is at, for example, position "1" so that the operator at the opposite end is able to adjust his end to the corresponding position 1 at his end of the foam block. Thus, as the wire traverses over the templates at opposite ends of the block it is controlled at the same rate of speed so that the wire approaches the same numbered increments as it passes over the pair of templates. One pass is made over the top surface of the airfoil, followed by a second pass over the bottom surface, following the same verbal coordination technique to control the movement of the wire over the ribs.

The foam material may be selected from the polystyrene or polyurethane family. A rigidized, low density, expanded bead-type of cellular polystyrene foam is preferred for its light weight and relative rigidity.

Referring again to FIG. 1, a split mold generally designated as 12 is comprised of a top half 14 and a bottom half 16. The mold halves 14 and 16 are fabricated by applying numerous layers of glass cloth to build up an extremely rigid mold, one that will resist any tendency to warp or twist out of shape when in use after the mold is fully cured. The top half of the split mold 12 has an annular lip 20 which completely circumvents the mold half. Lip 20 mates with similar lip 22, circumventing the bottom half of the mold 16. The foam wing core 10 is cut to shape as previously described to generally conform to the airfoil shape defined by the two halves when they are joined together. The wing core, however, is cut slightly oversized so that when the foam core is placed in the cavity defined by the two halves, annular lips 20 and 22 will not mate together, as is indicated in FIG. 2.

The split mold 12 is prepared in the following manner. The mold is first coated with a mold release (wax) such as Perma-Mold Release, manufactured by Brulin and Company of Indianapolis, Indiana. A first layer, for example, of glass cloth is then placed in the mold half 14 having a weight of, for example, 1.86 ounce per square yard. The fiberglass cloth is a type manufactured by Burlington Glass Fabrics Co., New York, N.Y. The glass cloth is impregnated with an epoxy resin until it is fully saturated. The epoxy resin is a type manufactured by Fiber Resin Corporation, Burbank, Calif., and is epoxy resin No. 5317L with hardener 5234M. A second fiberglass layer, for example, may be applied to the first layer of fiberglass using, for example, glass cloth weighing 4.06 ounces per square yard. The second layer is again saturated with epoxy resin. The first half of mold 14 is then set aside while the same routine is followed in the second half 16. Before the layers of glass cloth are fully cured, a layer of epoxy resin is applied on the partially cured glass in preparation for inserting and bonding the foam wing core panel 10 into the mold cavity.

Turning to FIG. 2, the cross-sectional view illustrates the foam core 10 inserted between the mold cavity defined by the two mold halves 14 and 16. The partially cured glass cloth wetted with epoxy resin adheres to surface 11 of wing core 10. It can be seen that when the top half of the split mold 14 is placed on skin 11 of foam core 10, the mold initially contacts the wing core 10 at the high point. The wing skins 18 and 17 in the mold halves contact wing core 10 at approximately points C and D which correspond to a high point in the wing chordwise which would also roughly correspond to the positions of main spars in a conventional type wing. The edges 19 and 23 on skins 18 and 17 are trimmed off flush with the mating surfaces 20 and 22 prior to joining the skins to the wing core 10. In order to bond the edges 19 and 23, a batch of epoxy resin is thickened with Cab-O-Sil which is manufactured by Cabot Corp., Boston, Mass., and applied to the edges 19 and 23. Cab-O-Sil is a filler material which adds to and stiffens uncured epoxy resins. As is shown in FIG. 2, gaps A and B at the leading and trailing edge of the split mold 12 are, of course, created by the over-sized wing core 10.

Turning to FIG. 3, the process is completed by compressing the foam core 10, thereby forcing the wing core surface 11 into intimate and positive contact with the partially cured, layered fiberglass skins 18 and 17. The edges or surfaces 20 and 22 are forced together by a series of, for example C-clamps, which are equidistantly spaced about the peripheral edge of the joined mold halves 14 and 16, thus forcing edges 19 and 23 together, completely enclosing the foam core 10 within skins 18 and 17. The completed wing panel is then set aside to fully cure, the curing time being approximately two hours. By compressing the wing at its high point, additional strength is provided at a critical point chordwise of the wing.

The method described could be utilized to fabricate other than aircraft wings, stabilizers, or the like. For example, helicopter blades could easily be fabricated utilizing the techniques of the instant invention.

It should be additionally noted that the techniques described in this application could be utilized in fields other than the aircraft field.

I claim:

1. A method of forming a rigidized airfoil section in a split mold comprising the steps of:
    forming a compressible mold insert, said insert being a low density, expanded bead cellular polystyrene foam to a size slightly larger than the depth of the cavity formed when said split mold halves are mated together,
    inserting a covering means for said compressible mold insert in each half of said split mold,
    applying bonding means to the inside surfaces of said covering means in said split mold to bond said insert in said mold,
    inserting said mold insert into said cavity formed by said split mold halves before said bonding means on said covering means is cured,
    clamping said split mold halves together to force said slightly larger compressible mold insert into intimate contact with said covering means thereby rigidizing the airfoil section at a critical structural point, and
    curing fully said bonding means on said covering means to said compressible mold insert in said clamped split mold prior to removal therefrom.

2. The invention as set forth in claim 1 wherein said rigidized airfoil section forms an aircraft wing.

3. The invention as set forth in claim 2 wherein said compressible mold wing insert is slightly larger at the high point of the wing spanwise along the airfoil shape of the wing so as to compress the wing between said split mold halves more at the high point of the wing spanwise than at any other point along the wing surface, thereby strengthening said wing spanwise in an area where aerodynamic stress forces are the greatest.

4. The invention as set forth in claim 1 wherein said covering means is at least one layer of glass cloth.

5. The invention as set forth in claim 1 wherein said bonding means is a thermosetting epoxy resin.

6. A method of forming a rigidized airfoil section of a model aircraft wing in a split mold comprising the steps of:
    forming a compressible mold insert, said insert being a low density, expanded bead cellular polystyrene foam to an airfoil shape which is slightly larger than the depth of the cavity formed when said split mold halves are mated together, said slightly larger airfoil shape being larger at the high point of the wing when viewed in cross-section so as to compress said insert more at the high point of said wing than at any other area along said wing,
    laying up at least one layer of glass cloth in each half of said split mold to form a cover for said compressible mold insert,
    coating and partially curing said at least one layer of glass cloth with thermosetting resin,
    coating said partially cured glass cloth cover with thermosetting epoxy resin,
    inserting said slightly larger mold insert into said cavity formed by said split mold halves before said thermosetting epoxy resin on said glass cloth cover is cured,
    clamping said split mold halves together to force said slightly larger compressible mold insert into intimate contact with said glass cloth cover thereby rigidizing the airfoil section at a critical structural point, and
    curing said glass cloth on said mold insert in said split mold for approximately two hours to fully cure said model aircraft wing prior to removal from said split mold.

* * * * *